Aug. 21, 1934.  A. C. FISCHER  1,971,100
SEWER PIPE JOINT
Filed July 16, 1925

Inventor:
Albert C. Fischer

Patented Aug. 21, 1934

1,971,100

UNITED STATES PATENT OFFICE 1,971,100

SEWER PIPE JOINT

Albert C. Fischer, Chicago, Ill., assignor to The Philip Carey Manufacturing Company, a corporation of Ohio Application July 16, 1925, Serial No. 44,138

3 Claims. (Cl. 285—115)

Figure 1:
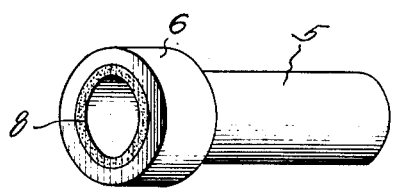
Figure 2:
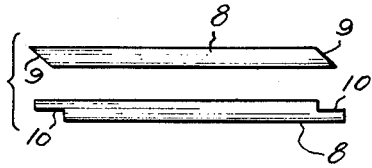
Figure 3:
Figure 4:
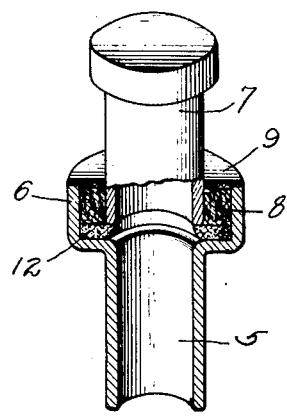
Figure 5:
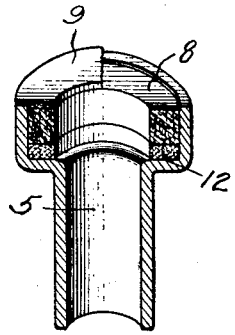
Figure 6:
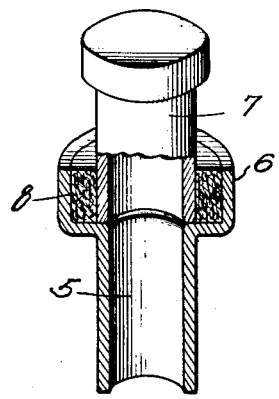
Figure 7:
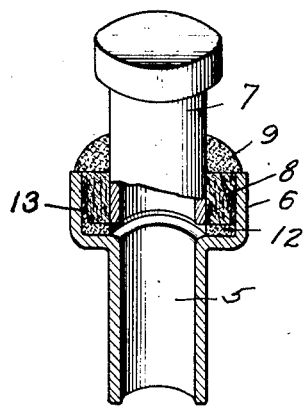
Figure 8:
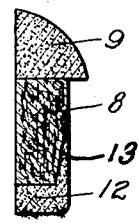

My invention relates in general to packings and has particular reference to a packing for pipe-joints and the like. The primary object of my invention is to provide means to compensate for expansion and contraction in concrete and the like pipes, as well as to provide means for affecting an effective seal, which will not only permanently leave the pipe sections leak proof but also provide a means to prevent the roots of trees from growing into the pipe thru fissures, cracks or ruptures in the pipe packing, or the pipe per se. The salient features of the invention will be described with reference to the accompanying drawing which illustrates several embodiments of the invention. In said drawing Figure 1 is a perspective view of a pipe section, illustrating the application of one form of my improved packing; Figure 2 is a detailed view in side elevation of two forms of packing; Figure 3 is a perspective view of a laminated form of packing; Figure 4 is a view in side elevation and partly in section of a pair of pipe sections with the joint between the same equipped with one form of packing; Figure 5 is a view in vertical section of one section of pipe, illustrating the application of the invention; Figure 6 is a view in side elevation and partly in section of a pair of joint pipe sections, illustrating the application of another form of my invention; Figure 7 is a similar view illustrating still another form of my packing and Figure 8 is a detailed view in vertical section of a portion of the packing shown in Figure 7.

Referring now to the drawing in detail, 5 represents a pipe section with the end thereof constructed with the customary enlargement 6 made to receive the end 7 of a pipe section. The enlargement 6 on the section 5 of the pipe is constructed to receive the packing for sealing the joint between the sections. The above described construction is more or less conventional in pipe sections, and heretofore it has been customary to fill the space in the enlargement 6 around the pipe end 7 so as to join the sections together and prevent leakage.

I accomplish this same purpose, but go further, and provide a packing which will not only affect a leak proof seal, but one which will compensate for expansion and contraction in the pipe sections, and also prevent roots from entering the pipe thru the packing, or from fissures or cracks in the pipe, which has heretofore resulted due to the fact that the packing has not accounted for expansion and contraction between the sections.

The packing which I employ is also an improvement on materials heretofore used, in that it can be conveniently applied, is cheap to manufacture and unusually effective in carrying out its intended use.

Referring to Figures 2 and 3 I will first describe the expanding qualities of the joint by calling attention to the sheet material 8 of Figure 3. This material preferably comprises a mixture of asphalt, or more than likely bituminous matter, with a good deal of fibrous material mixed therewith, and then rolled out in sheet form, as shown, after which it is cut to the proper width and length to produce sheets, as shown in Figure 3. These sheets may be formed comparatively thin so as to employ the same in layers, as shown in Figure 3, or of a greater thickness as shown in Figure 2, and used in single sheet form.

The pliable nature of the material enables me to form the same into an encircling band, which may be fitted into the enlargement 6 of the pipe 5, as shown in Figure 1. To join the confronting ends of the bands I may either chamfer the edge as shown at 9 in Figure 2, or else use a rabbeted edge 10, also shown in Figure 2, or by using laminated sheets, as shown in Figure 3, I may join the sheets so as to leave an overlap 11 on opposite ends of the sheet to accomplish practically the same alinement as shown at 10 in Figure 2. Any one of these three constructions will enable the thickness of the band to be maintained uniform.

Due to the fact that I use fibrous material as a filler for the bituminous matter, in forming the sheets I am enabled to realize expanding qualities in the packing which will compensate for expansion and contraction of the pipe sections, and at the same time produce a waterproof packing band which will effectively seal the joint. In using this band I will refer to Figure 6, which illustrates the same in use. In this figure, however, the thickness of the band is somewhat exaggerated as compared to the thicknesses shown in Figures 1 to 3 inclusive, but this, of course, is simply a matter of degree, as the size of the enlargement 6 will depend a great deal on the thickness of the band. In any event for this particular form the band simply encircles the end 7 of the pipe section to be joined to the section 5 and snugly fits in the enlargement 6. As an extra precaution the top of the joint may be covered over with a plastic cement 9, see Figures 4 and 5, the same being in layer formation or else a goodly quantity of the same, as shown in Figures 7 and 8, may be built up from the top of the joint, as shown in these figures. In lieu of plastic cement concrete may be used in its stead.

As a combination joint I will refer to Figures 4, 5, 7 and 8. In this form a layer or ring of plastic cement 12 is used in combination with the expansion band 8 the same being first introduced into the enlargement 6 and the band placed upon the same, as shown. The plastic cement ring 12 may be of a size to underlie the thickness of the end section 7 of the pipe, so that the section rests upon the same, as shown in Figure 4, or else it may be made so that the diameter of the same is equal to the diameter of the pipe, as shown in Figures 4, 5, 7 and 8. In any event the plastic cement ring or layer 12 will act as a cushion for the expansion band 8, and in some forms I would also arrange the ring 12 so as to encircle the band 8 as shown at 13 in Figures 7 and 8. In all the forms I would suggest the use of a plastic or concrete cover such as 9 for the top of the joint.

When using the band 8 with or without the plastic cement ring 12 the band will be wedged snugly into place so as to affect a seal, and at the same time lend its influence to the pipe sections to compensate for expansion and contraction.

I claim:

1. The combination of a pipe line composed of mating pipe sections, a gasket comprising a preformed, continuous and uninterrupted ring comprising a homogeneous mixture of bituminous material having fibrous material incorporated therein, said ring being sufficiently ductile and resilient to adapt itself to the shape of the space into which it is forced, and a ring of cementing material contacting with and facing one entire end of the first named ring.

2. The combination of a pipe line composed of mating pipe sections, a packing gasket for the pipe joints comprising a preformed, continuous and uninterrupted base ring formed from a homogeneous mass of bituminous material and fibers and having a conically shaped outer circumference, said ring being sufficiently ductile and resilient to adapt itself to the shape of the space in which it is forced, and a nose ring on that end of the ring which is of reduced thickness, said nose ring of cementing material having a flanged projection to build up the base ring to uniform thickness throughout its entire length.

3. The combination of a pipe line composed of mating pipe sections, a packing gasket for the pipe joints comprising a preformed, boardlike strip of fibrated bituminous matter having rabbet ends, said strip being of sufficient density to maintain its dimension in handling and sufficiently flexible to bring its ends in abutting overlapped relation to provide a continuous uninterrupted ring, and a nose ring of softer material applied to the inserted end of the strip in order that the same may spread under pressure to seal the pipe sections.

ALBERT C. FISCHER.